May 27, 1969 J. VAN BAEL Re. 26,582

PLASTERING SPLASH APRON

Original Filed Nov. 8, 1963

INVENTOR.
JOSEPH VAN BAEL

BY Whittemore, Hulbert & Belknap
ATTORNEYS

United States Patent Office

Re. 26,582
Reissued May 27, 1969

26,582
PLASTERING SPLASH APRON

Joseph Van Bael, 37426 Lakeshore Drive,
Mount Clemens, Mich. 49406

Original No. 3,290,838, dated Dec. 13, 1966, Ser. No. 322,328, Nov. 8, 1963. Application for reissue June 30, 1967, Ser. No. 653,601
Int. Cl. E04c *1/04;* E04h *14/00;* E04b *7/18*
U.S. Cl. 52—99 15 Claims

Matter enclosed in heavy brackets [ ] appears in the original patent but forms no part of this reissue specification; matter printed in italics indicates the additions made by reissue.

The present invention relates to a means and method for protecting finished plastered side walls of a room or the like during the construction or refinishing thereof and relates more particularly to a protective splash apron which is adapted to protect the finished side wall while the ceiling of the room is being plastered.

The present invention may be best understood in connection with the plastering of a relatively large room of a commercial building where it is usually common practice to plaster the side walls of the room prior to plastering the ceiling. Heretofore, prior to plastering the ceiling, the mechanic usually takes a large sheet of fabric material such as canvas and covers the particular side wall as well as any of the metal frame members for doors, windows, etc., located or mounted therein. Various means have been used to hold the canvas in place. It should be appreciated that such a protective cover is desirable in order to prevent the splashed plaster from contacting the finished plastered side wall, metal frame members of doors or windows, etc., to prevent deterioration of the metal, staining or marring of the side walls and the like. It should be further appreciated that such discoloration can spread to other areas and detrimentally detract from the overall appearance of the finished side wall, prior to the application of paint, as well as detract from the appearance of the door and window frames. Often such discolorations cannot be removed from the metal parts. The use of protective tapes on metal frame members provide good protection against staining by the plaster but is costly and is practical to use only upon readily accessible flat surfaces.

Generally speaking, this invention relates to a novel means and method for protecting finished side walls by providing a barrier or protective cover over the side walls while the ceiling is being plastered. The means of this invention includes the use of flexible plastic sheet material composed of compositions based on thermoplastic resins or polymers and characterized by resistance to moisture, solvents, acids and alkalies. The protective splash apron of the invention includes an angle shaped casement bead which forms part of the ceiling support structure. The casement bead is arranged longitudinally along the side wall adjacent the upper edge thereof and is adapted to have connected to the horizontal flange thereof the metal lath for the ceiling support structure. An elongated relatively thin strip of flexible material such as plastic has the upper marginal longitudinal edge thereof appropriately connected to the top surface of the horizontal flange of the casement bead. The vertical flange of the casement bead is laterally spaced from the finished side wall a relatively short distance such that the remaining portion of the strip of flexible material hangs freely in the space between the finished side wall and the vertical flange. The lower marginal longitudinal edge of the strip of flexible material terminates a relatively short distance below the bottom edge portion of the flange. A relatively large sheet of flexible material such as plastic is connected to the lower marginal edge of the strip of material by means of an elongated adhesive element or other suitable fastening means. The relatively large sheet of flexible material covers the majority of the remaining portion of the side wall below the casement bead.

The strip of flexible plastic material is very thin, as an example .004" thick, and is provided with a single row of perforations at a point directly and laterally opposite the vertical flange of the casement bead in the space between the vertical flange and the side wall. After the ceiling has been plastered, the lower adhesive element is removed thereby removing the relatively large sheet of flexible material, which may be retained for subsequent use, from the strip of material. The portion of the strip of flexible material below the perforations is removed from the portion of the strip of material above the perforations by applying a separating force thereto as will be subsequently explained. The lower portion of the strip of material is thrown away. The upper portion of the strip flexible material which remains secured to the casement bead remains in place, hidden from view due to the fact that it is impossible to view the lower edge of the remaining material through the relatively small space provided between the vertical flange and the side wall.

It is an object of the present invention to disclose and provide a novel protective means for plastered side walls of a room of a house, commercial building, or the like.

Another object of the present invention is to disclose and provide a means and method for protecting not only the finished plastered side walls but also the door frame members, window frame members, and the like.

Still another object of the present invention is to provide a protective splash apron for use during the plastering of the ceiling of a room comprising an elongated support member, an elongated strip of relatively flexible material, and fastening means connecting the upper longitudinal marginal edge portion of the strip of material to the support member, the remaining portion of the strip of flexible material hanging freely from the support member, said strip of material being provided with longitudinally arranged perforations on an intermediate portion thereof to permit the portion of the strip of flexible material below the perforations to be readily removed from the other portion of the strip of flexible material after the ceiling has been plastered.

A further object of the present invention is to provide a protective splash apron for use while plastering the ceiling of a room having a finished plastered side wall, said apron comprising an elongated angle shaped casement bead extending longitudinally along the side wall at the upper edge thereof and constituting part of the support structure for the ceiling, said casement bead having a substantially vertically arranged flange laterally spaced from the side wall a relatively short distance and a substantially horizontal arranged flange, an elongated strip of flexible material having a length approximately equal to the length of the casement bead, said strip of material having the upper longitudinal marginal edge portion thereof overlying the top surface of the horizontal flange and operatively connected thereto, with the remaining portion thereof hanging substantially freely in a vertical plane in the aforesaid space between the vertical flange and the side wall, said remaining portion having the lower marginal longitudinal edge thereof spaced below the bottom edge portion of the vertical flange, fastening means for detachably securing a relatively large sheet of flexible material to the lower marginal longitudinal edge of the strip of material, said sheet substantially covering the remaining portion of the side wall below the casement bead, said strip being provided with longitudinally arranged perforations at a point opposite an intermediate portion of the vertical flange to permit the portion of the strip of material below the perforations to be readily removed from the portion of the strip of flexible material above the perforations after the ceiling has been plastered, said strip and sheet of flexible material protecting the side wall from splashed plaster while the ceiling is being plastered.

A still further object of the present invention is to provide a protective splash apron of the aforementioned type wherein an elongated adhesive element is connected on one longitudinal edge portion to the upper longitudinal marginal edge portion of the strip of flexible materail and is connected on the other longitudinal edge portion to the top surface of the horizontal flange, with the adhesive element extending substantially the entire length of the casement bead.

Another object of the present invention is to provide a protective splash apron of the aforementioned type wherein metal lath is secured to the longitudinal marginal edge portion of the horizontal flange and forms part of the ceiling support structure.

Still another object of the present invention is to provide a protective splash apron of the aforementioned type wherein the strip and/or sheet of flexible material is made from relatively thin plastic material such as polyethylene or the like.

A further object of the present invention is to provide a protective splash apron of the aforementioned type wherein the fastening means includes an elongated adhesive element which extends substantially the entire length of the strip and sheet of flexible material.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

Figure 1:
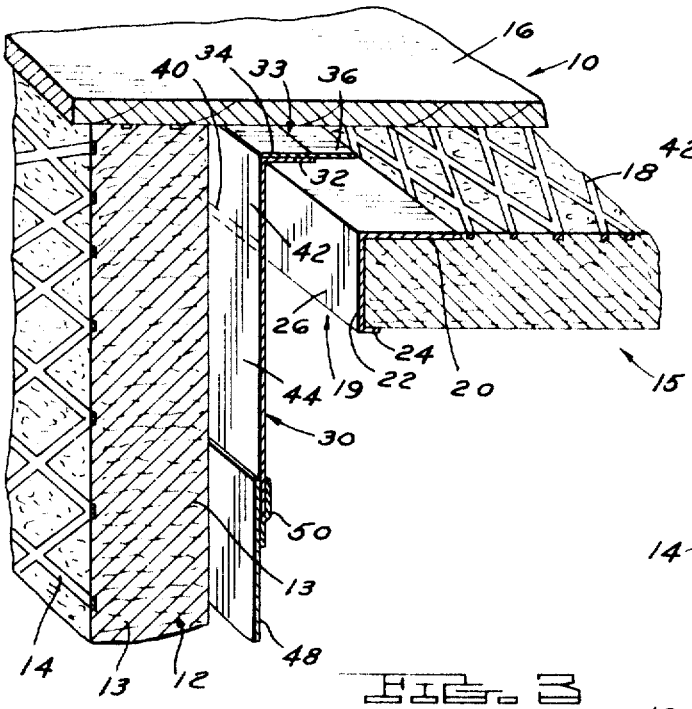
FIGURE 1 is a fragmentary perspective view of an upper corner of a room, with certain parts broken away and in cross-section to illustrate features of the present invention.

In the example illustrating this invention in the drawing, an interior corner construction 10 of a room of a commercial building is illustrated. The vertical side wall 12 is comprised of plaster or other cementitious material 13 which is applied to metal lath 14 or the like as is conventional in the art. The ceiling 15 is also of conventional construction and includes the usual floor boards or equivalent supporting members 16 to which is connected as is well known in the art, metal lath 18 or the like.

Figure 2:
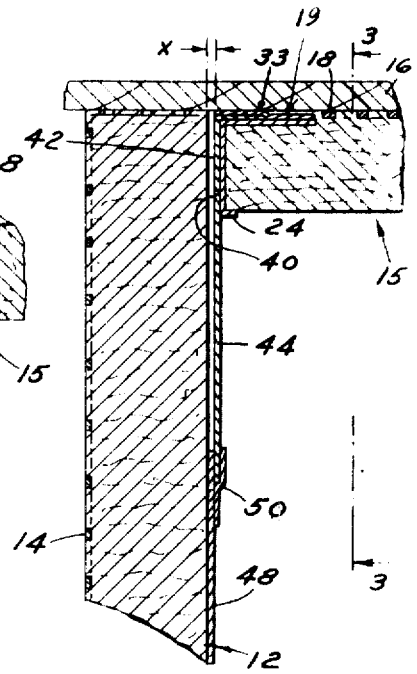
FIGURE 2 is a fragmentary elevational view of the upper corner construction illustrated in FIGURE 1.
Figure 3:
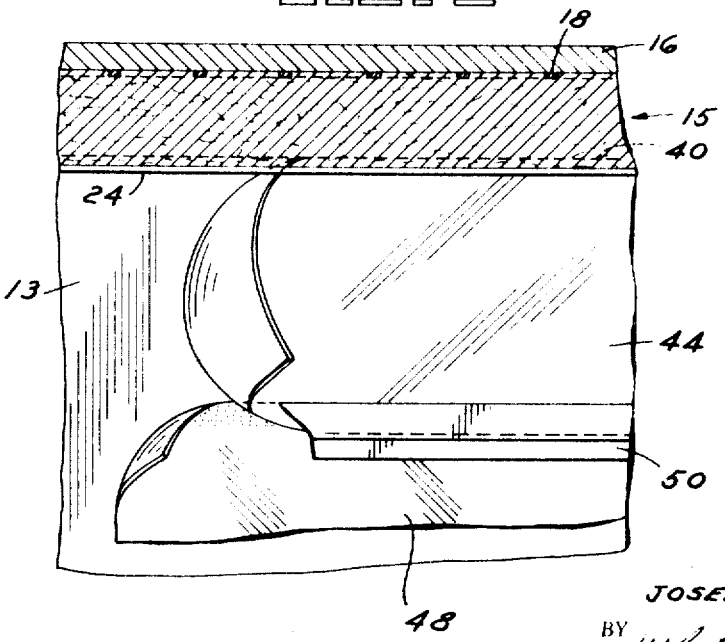
FIGURE 3 is a fragmentary view in section taken substantially on line 3—3 of FIGURE 1 and illustrating the manner of removing the flexible material after the ceiling has been plastered.

The ceiling support structure includes not only the support members 16 but also longitudinally extending metal casement beads 19. Each bead 19 comprises a horizontal flange 20 and a vertical flange 22 having at the lower marginal edge thereof a relatively short inwardly turned flange 24. The casement beads 19 extend along the side walls adjacent the upper edges thereof so as to usually form a continuous uninterrupted endless bead. The casement beads carry the metal lath 18 as previously described. The horizontal flange [22] *20* of each casement [head] *bead* 19 is laterally spaced from the front surface of the side wall 12 a relatively short distance as is indicated by the letter X in FIGURE 2. This distance may be, as an example, approximately 1/32". In any event, the back surface 26 of the vertical flange 22 is never located tightly against the finished side wall 12 for a reason which will subsequently appear. The size of the space X has been exaggerated in the drawing for purposes of illustration.

The edges of the metal lath 18 are appropriately secured to the longitudinal marginal edges of the horizontal flanges 20 by soldering or by other conventional fastening means as is well known in the art.

Prior to erecting each casement bead 19, an elongated strip of flexible material 30 is connected thereto. Initially, the upper longitudinal marginal edge portion 32 of the strip of flexible material 30 is superimposed or placed over the flange 20. An elongated adhesive strip or band 33 such as masking tape is secured on one longitudinal edge portion 34 to the upper edge portion 32 of the strip 30 while the remaining longitudinal portion 36 of the band 33 is secured to the metal flange 20 as best illustrated in FIGURE 1. The strip of flexible material 30 and the adhesive band or tape 33 each has a length approximately equal to the length of the metal casement bead 19.

As an example, the casement bead 19 may be of any length, with the horizontal flange having a width of 1" while the vertical flange is ¾" wide. The strip of flexible material is 7" wide with approximately ½" thereof superimposed over the horizontal flange. The band or tape 33 is 1" wide or in other words equal in width to the flange 22.

The strip of flexible material 33 is provided with a single longitudinally extending row of perforations 40 which are located near the upper marginal longitudinal edge such that when the strip 30 is in place as illustrated in FIGURE 1, the perforations 40 are located above the bottom edge portion of the flange 24. The perforations 40 thus divide the strip 30 into upper and lower portions 42 and 44 respectively and are located in the example previously stated approximately 1 1/16" from the upper longitudinal marginal edge of the strip of flexible material 30.

The strip of flexible material 30 particularly adapted for the present invention is made from an impervious, inert, non-reactive plastic material. Such plastic material may be based upon the thermoplastic resins or polymers including selected compounds to provide a plastic barrier or cover characterized by resistance to tearing, moisture, solvents, acids, and alkalies, by sufficient compliance and flexibility to permit ready mounting as previously described, and by resistance to aging. Such plastic material may include polyethylene and compounds thereof, vinyl polymers, and cellulose derivatives. A polyethylene strip 30 has been used successfully and has a thickness of .004". Thus, when the casement bead 19 is properly mounted the vertical portion of the strip 30 is substantially freely suspended and extends through the relatively narrow space X described previously and terminates approximately 6" below the bottom flange 24.

It will be further appreciated that the height of ceilings vary depending on the particular building. Assuming that a 10' high ceiling is used it is necessary to provide an additional relatively large sheet of flexible material to cover the remaining 9½' of side wall.

The present invention includes a relatively large sheet of flexible material 48 having a length approximately equal to the length of the casement bead 19 or strip 30 and of a sufficient size to cover the remaining exposed area of the plastered side wall 12. The same type of material may be used for the sheet 48 as used for the strip 30. In certain cases canvas could be used. It is important to remember however that the strip 30 carries the weight of the sheet or cover 48.

It has been found, when polyethylene is used for both the strip 30 and cover 48 that a 1" wide elongated adhesive band or masking tape 50 may be used which extends the entire length of the strip 30. The opposite longitudinal edge portion of the strip 30 and cover 48 are overlapped as illustrated in the drawing. It should be understood that other appropriate fastening means may be utilized in place of the strip 50 to suspend the cover 48 from the strip 30.

After the cover 48 has been suspended in the manner just described, the mechanic can then proceed and plaster the ceiling 15. With the present invention any plaster or other cementitious material which is splashed will collect on the splash apron without marring or staining the finished plastered side walls, windows, and doors and window frames.

When the plastering of the ceiling has been completed, or when that portion of the ceiling adjacent the side wall is completed, the adhesive strip 50 is removed so as to separate the cover 48 from the lower portion 44 of the strip 30. The cover 48 may be cleaned and subsequently reused. A force is then applied to the lower portion 44 so as to separate or break the perforations 40 and thereby remove the lower portion 44 from the upper portion 42 of the strip 30. The lower portion 44 may be discarded or used for other purposes.

The upper portion 42 of the strip 30 remains permanently in place, with the lower edge thereof hidden from view due to the fact that the space X is very small.

The drawing and the foregoing specification constitute a description of the improved plastering equipment in such full, clear, concise and exact terms as to enable any person skilled in the art to practice the invention, the scope of which is indicated by the appended claims.

What I claim as my invention is:

1. A protective splash apron [for use during the plastering of the ceiling of a room or the like] comprising an elongated angle shape casement bead having a horizontal flange, a strip of flexible material having the upper longitudinal edge portion superimposed over the top surface of said horizontal flange, fastening means for operatively connecting said upper longitudinal edge portion to said horizontal flange, said fastening means comprising an elongated adhesive element secured along one longitudinal edge to the upper longitudinal marginal edge portion of said strip of material and secured along the other longitudinal edge to said casement bead, the remaining portion of said strip of material hanging freely along the outer surface of said vertical flange and terminating a predetermined distance below the bottom edge portion of said vertical flange, a [reusable] sheet of flexible material, and means for detachably connecting said sheet to the lower *longitudinal* marginal edge *portion* of said strip of material at a point below said casement bead, said means comprising an elongated strip of adhesive material secured along one longitudinal edge portion to the lower *longitudinal* marginal edge *portion* of said strip of material and secured along the other longitudinal edge portion to the upper portion of said sheet of flexible material, said strip of material being [provided with longitudinally arranged perforations] *severable at a tear zone located* laterally and directly opposite *from* an intermediate portion of said vertical flange to permit the portion of said strip of material below [the perforations] *said tear zone* to be readily removed from the [other] *upper* portion of said strip of material [after the ceiling has been plastered].

2. A protective splash apron for use [during the plastering of the ceiling of] *with* a room or the like having a sidewall comprising an elongated angle shape casement bead extending longitudinally along the side wall at the upper edge thereof, said bead having a [horizontal] *vertical* flange spaced from the side wall a relatively short distance and defining a relatively narrow clearance space therebetween and a [vertical] *horizontal* flange, a strip of flexible material having the upper longitudinal edge portion superimposed over the top surface of said horizontal flange, fastening means for operatively connecting said upper longitudinal edge portion to said horizontal flange, the remaining portion of said strip of material hanging freely from said [head] *bead* in a vertical plane through the aforesaid clearance space along the outer surface of said vertical flange and terminating a predetermined distance below the bottom edge portion of said vertical flange, and a sheet of flexible material detachably connected to the lower marginal edge of said strip of material [prior to plastering the ceiling], said strip of material being [provided with longitudinally arranged perforations] *severable at a tear zone* located in said clearance space directly opposite *from* an intermediate portion of said vertical flange to permit the portion of said strip of material below [the perforations] *said tear zone* to be readily removed from the [other] *upper* portion of said strip of material [after the ceiling has been plastered], the bottom [perforated] edge of said [other] *upper* portion of the strip of material being substantially hidden from view in the aforesaid clearance space.

3. A protective splash apron for use [while plastering the ceiling of] *with* a room or the like having a [finished plastered] *ceiling and a* side wall, said apron comprising an elongated angle shaped casement bead extending longitudinally along the side wall at the upper edge thereof and constituting part of the support structure for the ceiling, said casement bead having a substantially vertically arranged flange laterally spaced from the side wall a relatively short distance and a substantially horizontally arranged flange, an elongated strip of flexible material having a length approximately equal to the length of said casement bead, said strip of material having the upper longitudinal marginal edge portion thereof overlying the top surface of said horizontal flange and operatively connected thereto, with the remaining portion thereof hanging substantially freely in a vertical plane in the aforesaid space between said vertical flange and the side wall, said remaining portion having the lower marginal longitudinal edge thereof spaced below the bottom edge portion of said vertical flange, fastening means for detachably securing a relatively large sheet of flexible material to said lower marginal longitudinal edge of said strip, said sheet substantially covering the remaining portion of the side wall below said casement bead, said strip being [provided with longitudinally arranged perforations at a point opposite] *severable at a tear zone adjacent* an intermediate portion of said vertical flange to permit the portion of the strip of material below the [perforations] *tear zone* to be readily removed from the portion of said strip of material above the [perforations after the ceiling has been plastered], *tear zone,* said strip and sheet of flexible material protecting the side wall [from splashed plaster while the ceiling is being plastered].

4. The protective splash apron defined in claim 3 wherein said upper longitudinal marginal edge portion of said strip of flexible material is connected to the top surface of said horizontal flange by means of an elongated adhesive element which extends substantially the entire length of said casement bead.

5. The protective splash apron defined in claim 3 wherein metal lath is secured to the longitudinal marginal edge portion of said horizontal flange.

6. The protective splash apron defined in claim 3 wherein said strip of flexible material is relatively thin plastic material.

7. The protective splash apron defined in claim 6 wherein said plastic material is polyethylene.

8. The protective splash apron defined in claim 3 wherein said fastening means includes an elongated adhesive element which extends substantially the entire length of said strip and sheet of flexible material.

9. A protective splash apron for use [while plastering] *with* the ceiling *and side wall* of a room [having a finished side wall], said apron comprising an elongated casement bead extending longitudinally along the side wall at the upper edge thereof, said casement bead having a substantially horizontally arranged surface and a substantially vertically arranged surface laterally spaced from the side wall a relatively short distance and defining a relatively narrow clearance space therebetween, an elongated strip of flexible material having a length approximately equal to the length of said casement bead, said strip of material having the upper longitudinal marginal edge portion thereof overlying said horizontal surface and operatively connected thereto, with the remaining portion of said strip of material hanging substantially freely from said casement bead in a vertical plane through the aforesaid clearance space between said vertical surface and the side wall, said remaining portion of said strip of material having the lower margin longitudinal edge thereof spaced below the bottom edge portion of said vertical surface, fastening means for detachably securing a relatively large sheet of flexible material to said lower marginal longitudinal edge of said strip, said sheet substantially covering the remaining portion of the side wall below said casement bead, said strip being [provided with longitudinally arranged perforations] *severable at a tear zone* located [in] *adjacent* said clearance space directly opposite an intermediate portion of said vertical surface to permit the portion of the strip of material below the [perforations] *tear zone* to be readily removed from the portion of said strip of material above the [perforations after the ceiling has been plastered] *tear zone*, said strip and sheet of flexible material protecting the side wall [from splashed plaster while the ceiling is being plastered].

10. The protective splash apron defined in claim 9 wherein said fastening means includes an elongated adhesive element which extends substantially the entire length of said strip and sheet of flexible material.

11. A protective splash apron for use [while plastering] *with* the ceiling *and side wall* of a room [having a finished side wall], said apron comprising an elongated casement bead extending longitudinally along the side wall at the upper edge thereof, said casement bead having a substantially horizontally arranged surface and a substantially vertically arranged surface laterally spaced from the side wall a relatively short distance and defining a relatively narrow clearance space therebetween, flexible material means for substantially covering the side wall, said flexible material means having a length substantially equal to the length of said casement bead, said flexible material means having the upper longitudinal marginal edge portion thereof overlying said horizontal surface and operatively connected thereto, with the remaining portion of said flexible material means hanging substantially freely from said casement bead in a vertical plane through the aforesaid clearance space between said vertical surface and the side wall to substantially cover the side wall, said flexible material means being divided into an upper portion and a lower portion, with [the demarkation between] said upper and lower portions [defined by an elongated roll of longitudinally arranged perforations located in] *being severable along a line adjacent* said clearance space [directly opposite an intermediate portion of said vertical surface] to permit the lower portion of the flexible material means below the [perforations] *line* to be readily removed from the upper portion of said flexible material means [after the ceiling has been plastered], said flexible material means protecting the side wall [from splashed plaster while the ceiling is being plastered], the bottom [perforated] edge of said upper portion upon removal of the lower portion from said flexible material means being substantially hidden from view [in] *adjacent* the aforesaid clearance space.

12. The protective splash apron defined in claim 11 wherein said upper longitudinal marginal edge portion is connected to said horizontal surface by means for an elongated adhesive element which extends substantially the entire length of said casement bead.

13. The protective splash apron defined in claim 11 wherein said flexible material means is made from relatively thin plastic material.

*14. In combination, an elongated casement bead having an angle-shaped cross-section and adapted to form a part of the support structure of a room, said casement bead having a pair of integrally connected flanges, each of said flanges having an inner surface and an outer surface, the outer surface of one of said flanges in use being laterally spaced a relatively short distance from a surface of the room to be protected to define a clearance space therebetween, a protective splash apron comprising a strip of flexible material having longitudinally extending edge portions, one of said edge portions being superimposed over and in contact with the outer surface of one of said flanges, said fastening means connecting said one edge portion of said strip of flexible material to the outer surface of said last-mentioned one flange with the remaining portion of said strip of flexible material extending through the aforesaid clearance space, with the other of said edge portions terminating at a distance from said casement bead and extending across the surface of the room to protect same, said strip of flexible material being severable along a line adjacent an edge of one of said flanges.*

*15. The structure defined in claim 14 wherein said strip of flexible material is provided with a tear zone arranged generally parallel to said longitudinal extending edge portions, said tear zone being located closest to said one edge portion and laterally opposite a flange of said casement bead.*

References Cited

The following references, cited by the Examiner, are of record in the patented file of this patent or the original patent.

UNITED STATES PATENTS

| | | | |
|---|---|---|---|
| 2,631,825 | 3/1953 | Zeitler | 52—221 X |
| 3,023,464 | 3/1962 | Zerbe | 52—127 X |
| 3,205,628 | 9/1965 | Frisk | 52—63 X |

FOREIGN PATENTS

| | | |
|---|---|---|
| 909,151 | 11/1945 | France. |
| 643,419 | 9/1950 | Great Britain. |
| 862,898 | 3/1961 | Great Britain. |

HENRY C. SUTHERLAND, *Primary Examiner.*

U.S. Cl. X.R.

52—173, 276, 515